United States Patent [19]

Gerlach

[11] Patent Number: 5,020,192
[45] Date of Patent: Jun. 4, 1991

[54] ADJUSTABLE TIE DOWN APPARATUS AND METHOD

[76] Inventor: Al Gerlach, 7023 Etiwanda Ave., Reseda, Calif. 91335

[21] Appl. No.: 330,542

[22] Filed: Mar. 30, 1989

[51] Int. Cl.$^5$ ............................................. F16G 11/00
[52] U.S. Cl. .................. 24/136 R; 24/115 R; 24/129 R
[58] Field of Search .............. 24/115 R, 115 H, 128, 24/129 R, 136 K, 136 R, 68 A, 68 R

[56] References Cited

U.S. PATENT DOCUMENTS

| 928,469 | 7/1909 | Miles | 24/129 R |
|---|---|---|---|
| 1,368,667 | 2/1921 | Thorson | 24/129 R |
| 2,869,906 | 1/1959 | Person | 24/115 R X |
| 4,220,306 | 9/1980 | Cueto et al. | 24/129 R X |
| 4,529,240 | 7/1985 | Engel | 24/129 R X |
| 4,850,084 | 7/1989 | Iwasaki | 24/115 R |

Primary Examiner—David A. Scherbel
Assistant Examiner—Jerrold D. Johnson
Attorney, Agent, or Firm—John J. Posta

[57] ABSTRACT

A device for use in tying down an object with respect to a fixed reference point is disclosed which has one end fastened to an object such as a tree or a pole, and the other end fastened to a fixed stake or other immovable reference point, with the length of the tie down being adjustable to allow it to be pulled tight between the object and the reference point and quickly and easily secured to act as a support retaining the object in position with respect to the reference point. The tie down of the present invention has a handle which may be pulled to tighten the tie down once it is properly positioned, thereby making the tightening operation both convenient and easy, and allowing greater tension to be placed in the tie down of the present invention without requiring greater effort to do so. The tie down utilizes a locking process which is both easy and simple to accomplish by a single person, and once secured, the tie down will remain solidly locked.

17 Claims, 2 Drawing Sheets

ADJUSTABLE TIE DOWN APPARATUS AND METHOD

BACKGROUND OF THE INVENTION

1. Field of the Invention

The present invention relates generally to an apparatus and method for tying down an object with respect to a fixed reference point, and more particularly to an improved tie down having one end fastened to an object such as a tree or a pole, and the other end fastened to a fixed stake or other immovable reference point, with the length of the tie down being adjustable to allow it to be pulled tight between the object and the reference point and quickly and easily secured to act as a support retaining the object in position with respect to the reference point.

There are a number of utilities for a tie down which may be used to secure an object with respect to a fixed reference point. Such tie downs are generally attached at one end to the object to be secured, and at the other end to the fixed reference point. The length of the tie down is adjustable, allowing it to be pulled tight to secure the object with respect to the reference point. Following the adjustment in length, the tie down is locked in position to continue to maintain the object in position with respect to the reference point.

Tie downs generally fall into two broad categories, namely guy supports such as guy wires, and general purpose tie downs. Guy supports are used to connect an object to a reference point or to connect two points to be secured together, with the guy support being under tension to prevent any relative movement. The guy support includes a mechanism for adjusting tension, or varying the length of the cable used to connect the object to the reference point or to connect the two points together. Typically, a turnbuckle is used to adjust the tension in the guy cable, drawing the two ends of the guy cable together to the degree necessary.

Examples of guy cables and the various apparatus used to adjust the tension in them are illustrated in U.S. Pat. No. 1,902,945, to Blackburn, in U.S. Pat. No. 2,792,243, to Ridgers, and in U.S. Pat. No. 3,402,518, to Lettunich. The Ridgers reference illustrated a guy fitting used to secure one end of a guy cable in a manner allowing easy installation, and also allowing a degree of adjustment of tension in the guy cable. The Lettunich reference shows a safety pull used to adjust the tension in a guy cable. Finally, the Blackburn reference illustrates a guard which may be placed over the turnbuckle or other adjustment apparatus to prevent them from being tampered with.

One feature of all of the guy cable devices is shared in common: the guy cable is placed under tension with an apparatus which is not generally very easy to adjust. The guy cable is installed relatively tightly in a first step, and tension is then placed in the guy cable in a second step. While this procedure is not at all quick or easy to perform, guy cables are typically installed in applications requiring a considerable degree of tension in the cable (more than could be placed in the cable by hand by pulling it tight), and are generally not temporary installations but rather permanent or semi-permanent installations.

In contrast, general purpose tie downs are used as utility supports in a wide variety of applications. They are characterized by two features, the first of which is that they are pulled tight by hand rather than being tightened by an apparatus such as a turnbuckle. The second feature characterizing general purpose tie downs is that they desirably may be quickly adjusted in length and, once adjusted, may be secured to maintain the tie down in position between the object to be secured and the reference point.

As such, general purpose tie downs offer both of their features as advantages over tie downs. In other words, in utility applications it is desirable to have the tie down be adjustable by hand. By so doing, no tools are needed to secure the tie down in position. Similarly, in utility applications it is desirable to have the tie down be adjustable by hand since it will be realized that the lengths at which the tie down may be set will vary widely. The desirability of having the tie down be quickly and easily adjustable are also self-evident.

General purpose tie downs are used for a wide variety of applications, including such diverse uses as securing antennas, holding loads on trailers, holding tent tarpaulins in position, and maintaining trees in proper position. Of these uses, the application which seems to have been discussed most in the art is the application as a tree tie down to hold a tree in a desired position, either for purposes of trimming the tree, or for training it to grow in the proper orientation.

Examples of references citing such a use of an adjustable tie down are found in U.S. Pat. No. 3,040,477, to June, in U.S. Pat. No. 3,526,056, to Stropkay, and in U.S. Pat. No. 4,319,428, to Fox. The Stropkay reference teaches a double loop tie fastener which is designed to couple a newly planted tree to a pole. The Stropkay tie fastener is tightened after one end of the device is fastened to the tree and the other end is fastened to the pole by using a tensioner which is placed on the strap and rotated. Accordingly, it may be seen that the Stropkay reference has no way of tightening the strap as the tie down is being installed, as is desirable.

Similarly, the Fox tie down is installed with one end fastened to the tree and the other end fastened to a stake in the ground. The Fox device uses a complex construction in which a portion of the rope used in the tie down is hollow, with the end of the rope attached to the stake looping around and passing back through the hollow portion. By pulling the rope through the hollow portion, the length of the tie down may be shortened, with a pair of sliding sleeves being used to lock the Fox tie down in position.

The Fox tie down requires that the end of the rope be pulled at a point above the hollow portion, which may be awkward to accomplish due to the height of the rope. In addition, as the rope is tightened, friction between the hollow portion of the rope and the end of the rope will greatly increase, making it increasingly difficult to tighten the rope. In addition, there is no provision make in Fox for pulling the rope, which may slip in the grasp. Accordingly, it may be perceived that the Fox device is difficult to tighten.

The June reference illustrates a tree limb holder having two ropes, with one end of each segment of rope being moveably attached to the other rope using a pair of slides. The June device is fastened at one end to a tree limb, and at the other end to a stake (or to another tree limb). By pulling the ends of the two segments of rope having the slides apart, the June device is tightened. When the June device is tightened, the slides will bite into the segments of rope on which they slide to retain them in position.

The June device works well, but also presents several disadvantages. First, the only place to grip the June device to position it is by the slides. Since as it is tightened the slides move apart, it will be appreciated that it is ever more awkward to grip. In fact, the June device may be best tightened by two people, one pulling each slide. In addition, the tighter the June device is secured, the more difficult it will be to release, since it must be additionally tightened before it may be released.

From the above descriptions of the art, the drawbacks and disadvantages of known tie downs are clear. Thus, the objectives of an improved general purpose tie down device may be enumerated. It is an objective of the present invention to provide a tie down which has a convenient handle which may be pulled to tighten the tie down of the present invention once it is positioned. Such a handle makes the tightening operation both convenient and easy, and should also allow greater tension to be placed in the tie down of the present invention without requiring greater effort.

In addition, it is an objective of the present invention that the process of locking or securing the tie down once it is in the proper position be as easy and simple to accomplish as possible. Both the tightening and the locking procedures should be able to be accomplished by a single person, without requiring undue expenditure of effort. The secured tie down must be able to remain solidly locked, and must not be susceptible to sudden inadvertent releasing. In addition, it is an objective of the present invention that the tie down of the present invention be easy to release, and that further tightening not be required in order to release the tie down.

It is also an objective of the present invention that it be of inexpensive and simple construction, therefore making it inexpensive to manufacture. It should also be durable and long lasting, and of high quality throughout to make the tie down of the present invention an even more desirable device. Finally, it is an objective of the present invention that all of the aforesaid advantages and objectives be achieved without incurring any substantial relative disadvantage.

SUMMARY OF THE INVENTION

The disadvantages and limitations of the background art discussed above are overcome by the present invention. With this invention, a tie down is used to secure an object at one end thereof to a reference point at the other end thereof. The tie down of the present invention uses a single rope or cable to accomplish its function, with one end of cable being attached to the object to be secured in conventional manner by tying or looping the one end of the cable around the object or a portion thereof.

The other end of the cable passes freely through an aperture in a handle, is looped around a stake or other retaining mechanism which comprises the reference point, and is fastened to the handle. Since the cable passes freely through the aperture in the handle and is not connected via the aperture to the handle, it will be appreciated that the handle is free to move along the length of the cable between the secured object and the reference point. At this time, the handle is approximately orthogonal to the portion of the cable between the secured object and the reference point. Accordingly, the handle may easily be pulled away from the reference point and toward the secured object to tighten the cable between the secured object and the reference point.

When the cable between the secured object and the reference point is sufficiently tight, the handle is locked on the portion of the cable passing through the aperture in the handle, which portion of cable is between the secured object and the reference point. This locking operation is accomplished by rotating the handle approximately ninety degrees to a position approximately parallel to the portion of the cable between the secured object and the reference point. The cable will be crimped at a ninety degree angle on both ends of the aperture in the handle, and the resulting friction will preventing the cable from further movement through the aperture in the handle. The cable is thus secured when the handle is in the parallel position to the portion of the cable between the secured object and the reference point.

The tie down of the present invention is completed by one additional component- a mechanism for retaining the handle in position parallel to the portion of the cable between the secured object and the reference point. In the preferred embodiment, this retaining mechanism is a hollow cylinder located in one of two alternate positions. The first position of the hollow cylinder is around the portion of the cable between the handle and the secured object.

If the hollow cylinder is located in this first position, its interior diameter is sufficient to encompass the end of the handle and the diameter of the portion of the cable between the handle and the secured object. With the handle in the position parallel to the portion of the cable between the secured object and the reference point, the hollow cylinder is slipped over the end of the handle facing the secured object in an interference fit. In this position, the hollow cylinder will retain the handle in its position parallel to the portion of the cable between the secured object and the reference point, until the hollow cylinder is removed to free the handle to rotate and release the cable.

The second alternate potential position is around the two portions of the cable between the handle and the reference point. If the hollow cylinder is located in this second position, its interior diameter is sufficient to encompass the end of the handle and the diameters of the two portions of the cable between the handle and the reference point. With the handle in the position parallel to the portion of the cable between the secured object and the reference point, the hollow cylinder is slipped over the end of the handle facing the reference point in an interference fit. In this position, the hollow cylinder will retain the handle in its position parallel to the portion of the cable between the secured object and the reference point, until the hollow cylinder is removed to free the handle to rotate and release the cable.

In a first alternate embodiment, a hook on one end of the handle is used instead of the hollow cylinder to retain the handle in its position parallel to the portion of the cable between the secured object and the reference point. With the handle in its position parallel to the portion of the cable between the secured object and the reference point, the portion of the cable adjacent to the end of the handle having the hook mounted thereon is slipped over the hook. The hook will then act to retain the handle in its position parallel to the portion of the cable between the secured object and the reference point, until the cable is removed from the hook to free the handle to rotate and release the cable.

In a second alternate embodiment, a slot located in one end of the handle is used to retain the handle in its position parallel to the portion of the cable between the secured object and the reference point. With the handle in its position parallel to the portion of the cable between the secured object and the reference point, the portion of the cable adjacent to the end of the handle having the slot located thereon is slipped into the slot. The slot will then act to retain the handle in its position parallel to the portion of the cable between the secured object and the reference point, until the cable is removed from the slot to free the handle to rotate and release the cable.

It may therefore be seen that the present invention teaches an improved general purpose tie down device which has a convenient handle which may be pulled to tighten the tie down of the present invention once it is properly positioned. This handle makes the tightening operation both convenient and easy, and also allows greater tension to be placed in the tie down of the present invention without requiring greater effort. The handle is also conveniently located in a position not presenting any difficulty to reach.

In addition, the improved tie down of the present invention utilizes a process of locking or securing the tie down once it is in the proper position which is both easy and simple to accomplish. Both the tightening procedure and the locking procedure may easily be accomplished by a single person, without requiring undue expenditure of effort. Once secured, the tie down will remain solidly locked, and will not be susceptible to sudden inadvertent releasing. In addition, the tie down of the present invention is quite easy to release, and further tightening is not required in order to accomplish the release of the tie down.

The tie down of the present invention is also of inexpensive and simple construction, therefore making it inexpensive to manufacture. It is durable and long lasting, and of high quality throughout to make the tie down of the present invention an even more desirable device. Finally, all of the aforesaid advantages and objectives of the present invention are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
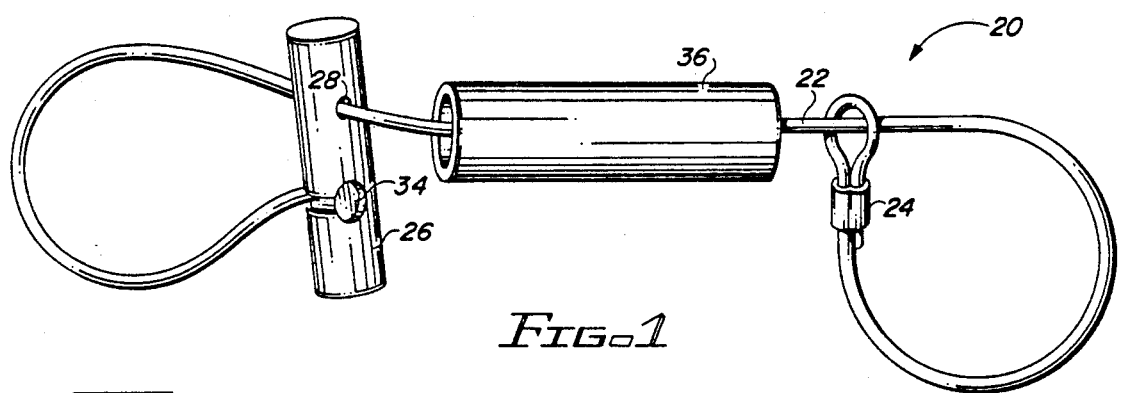
FIG. 1 is a plan view of the preferred embodiment of the tie down of the present invention.

The preferred embodiment of the present invention is illustrated in FIG. 1, which shows a tie down 20 made of a single cable 22. The cable 22 may be a segment of rope, or it may be a woven metal cord, and must exhibit a degree of flexibility sufficient to make it acceptable for use as a tie down. A first end of the cable 22 is adapted for attachment to the object to be secured, and in the preferred embodiment this first end of the cable 22 is shown on the right in FIG. 1 as a lasso. This first end of the cable 22 is looped around the cable 22 to form the lasso, with the loop being closed by a loop retainer 24.

Figure 2:
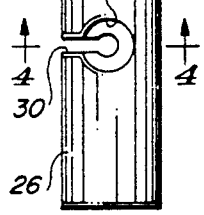
FIG. 2 is a front plan view of the handle used in the tie down shown in FIG. 1.
Figure 3:
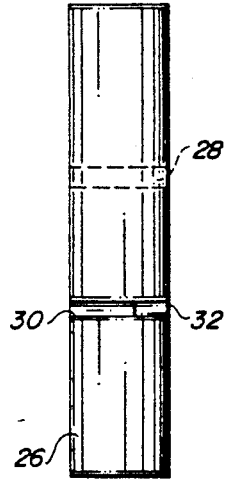
FIG. 3 is a side plan view of the handle shown in FIG. 2.

A handle 26 is attached to the second end of the cable 22, with the handle 26 being shown in detail in FIGS. 2 and 3. The handle in the preferred embodiment is essentially cylindrical, and has an aperture 28 extending radially therethrough. The aperture 28 in the preferred embodiment is just sufficiently large in diameter to allow the cable 22 to pass freely therethrough. In the preferred embodiment, the aperture 28 is located just to one side of the middle of the handle 26.

Figure 4:
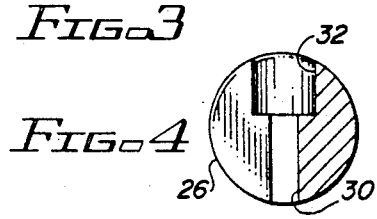
FIG. 4 is a cutaway view from the end of the handle shown in FIGS. 2 and 3.
Figure 16:
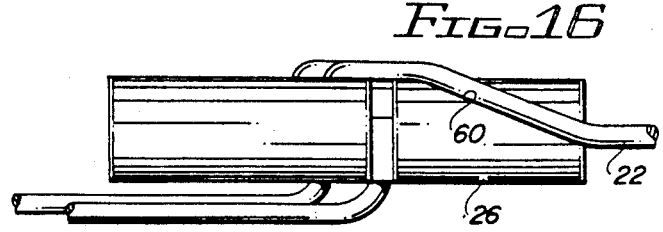
FIG. 16 is an end view of the handle shown in FIG. 15.

Also located on the handle 26 is a mechanism for retaining the second end of the cable 22. In the preferred embodiment shown, this mechanism for retaining the second end of the cable 22 is a slot 30 cut into the side of the handle 26, and an aperture 32 drilled into the top of the handle 26 approximately one-third of the way through the handle 26. The innermost portion of the slot 30 extends just past the centerline of the aperture 32, as shown in FIGS. 3 and 4. In the preferred embodiment, the slot 30 and the aperture 32 are located just to the other side of the middle of the handle 26 from the aperture 28.

Figure 5:
FIG. 5 is a perspective view of the end of the cable shown in FIG. 1 which is attached to the handle shown in FIGS. 2 through 4.

The second end of the cable 22 in the preferred embodiment has a plug 34 thereon, as shown in FIG. 5. The plug 34 is installed on the second end of the cable 22 after the second end of the cable 22 is first passed through the aperture 28 in the handle 26. The diameter of the plug 34 is just smaller than the diameter of the aperture 32 in the handle 26, but larger than the width of the slot 30 in the handle 26. The width of the slot 30 is sufficient to admit the cable 22 therein.

The second end of the cable 22 is placed in the slot 30 in the handle 26, and then is pulled to draw the plug 34 into the aperture 32 in the handle 26, as shown in FIG. 1. Thus, the second end of the cable 22 will be retained in the handle 26, with the cable 22 passing freely through the aperture 28 in the handle 26. It should be noted that other techniques could be used to retain the second end of the cable 22 in the handle 26. For example, a hole (not shown) could be drilled in the handle 26, and the second end of the cable 22 could be passed through the hole and knotted.

Completing the construction of the tie down 20 of the preferred embodiment is a hollow cylinder 36, which is installed over the portion of the cable 22 between the handle 26 and the first end of the cable 22 forming the lasso which will retain the object to be secured. The interior diameter of the hollow cylinder 36 is sufficient to encompass the end of the handle 26 and the diameter of the portions of the cable between the handle 26 and first end of the cable 22 forming the lasso which will retain the object to be secured. Preferably, the fit of the hollow cylinder 36 over the end of the handle 26 and the cable 22 will be an interference fit acting to retain the hollow cylinder 36 on the end of the handle 26 once it is so placed.

Figure 6:
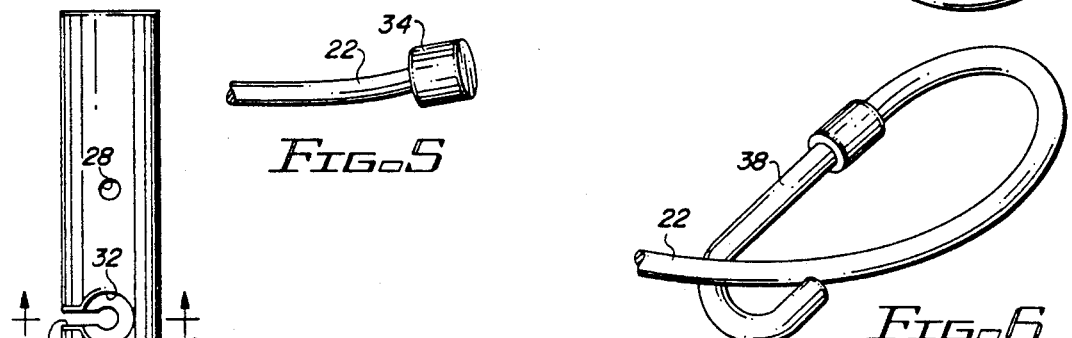
FIG. 6 is a plan view of a first alternate end of the cable shown in FIG. 1 for use in holding the object to be secured.
Figure 7:
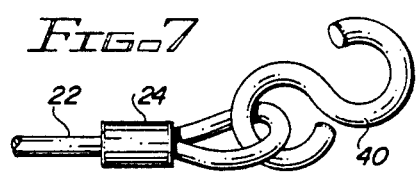
FIG. 7 is a plan view of a second alternate end of the cable shown in FIG. 1 for use in holding the object to be secured.
Figure 8:
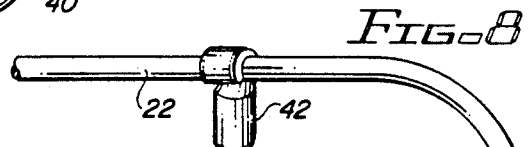
FIG. 8 is a plan view of a third alternate end of the cable shown in FIG. 1 for use in holding the object to be secured.

FIGS. 6 through 8 show alternate embodiments for the first end of the cable 22 different from that shown in FIG. 1. In FIG. 6, a hook 38 is attached to the first end of the cable 22. In FIG. 7, an S-hook 40 is attached to a loop at the first end of the cable 22. In FIG. 8, a slide hook 42 is attached to the first end of the cable 22. The precise configuration used to retain the object to be secured at the first end of the cable 22 could be any of the devices illustrated herein, or others not shown or discussed without affecting the scope of the present invention.

Figure 9:
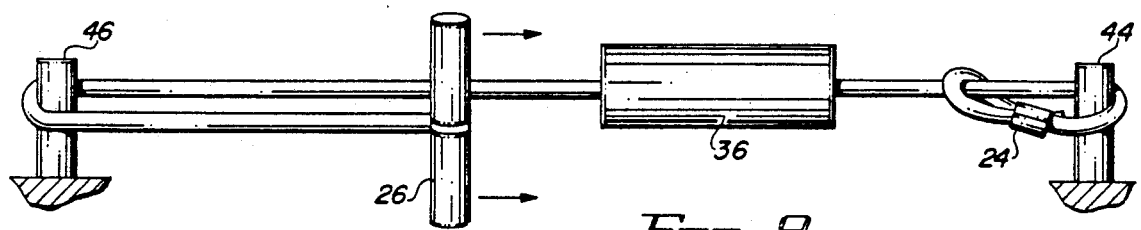
FIG. 9 is a somewhat schematic view showing the tie down of the present invention attached at one end to the object to be secured, and at the other end to the reference point, with the handle being pulled to tighten the cable between the secured object and the reference point.
Figure 10:
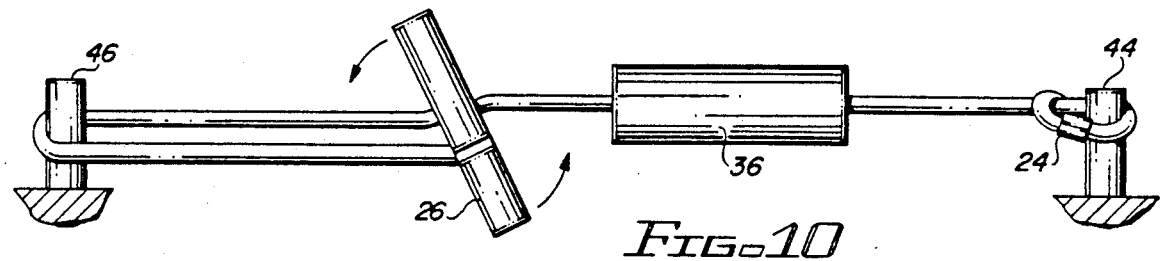
FIG. 10 is a somewhat schematic view of the tie down shown in FIG. 9 showing the handle being rotated to crimp the portion of the cable extending through the aperture in the handle, thereby preventing the cable from moving further through the aperture in the handle.
Figure 11:
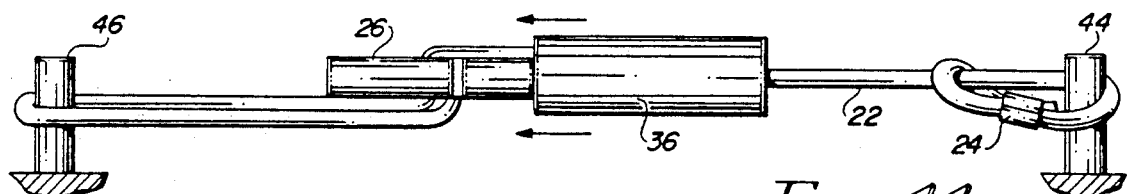
FIG. 11 is a somewhat schematic view of the tie down shown in FIGS. 9 and 10 showing the hollow cylinder being moved over the end of the handle to retain the handle in position parallel to the portion of the cable between the secured object and the reference point.

In FIGS. 9 through 11, the operation of the tie down 20 of the present invention is illustrated with respect to a schematically shown secured object 44 to be secured to the first end of the cable 22, and a schematically shown reference point 46 to which the loop at the second end of the cable 22 is attached. Since the cable 22 passes freely through the aperture 28 in the handle 26 and is not connected via the aperture 28 to the handle 26, it will be appreciated that the handle 26 is free to move along the length of the cable 22 between the secured object 44 and the reference point 46.

At this time, note that the handle 26 is approximately orthogonal to the portion of the cable 22 between the secured object 44 and the reference point 46. In FIG. 9, the handle 26 is pulled away from the reference point 46 and toward the secured object 44 to tighten the cable 22 between the secured object 44 and the reference point 46. Note that the handle 26 may be pulled easily, and that as the handle 26 is pulled the cable 22 will freely move around the reference point 46 to tighten the cable 22 between the secured object 44 and the reference point 46.

Referring next to FIG. 10, when the cable 22 between the secured object 44 and the reference point 46 is sufficiently tight, the handle 26 is locked onto the portion of the cable 22 passing through the aperture 28 in the handle 26, which portion of cable 22 is between the secured object 44 and the reference point 46. This locking operation is accomplished by rotating the handle 26 approximately ninety degrees to a position (shown in FIG. 11) approximately parallel to the portion of the cable 22 between the secured object 44 and the reference point 46.

The cable 22 will be crimped at a ninety degree angle on both ends of the aperture 28 in the handle 26, and the resulting friction from the crimping action will prevent the cable 22 from further movement through the aperture 28 in the handle 26. The cable 22 is thus secured when the handle 26 is in the parallel position to the portion of the cable 22 between the secured object 44 and the reference point 46. It will be appreciated by those skilled in the art that when the handle 26 is in the position shown in FIG. 11, it will not be longitudinally moveable with respect to the cable 22.

As stated above, the interior diameter of the hollow cylinder 36 is sufficient to encompass the end of the handle 26 and the diameter of the portion of the cable 22 between the handle 26 and the secured object 44. With the handle 26 in the position shown in FIG. 11 (parallel to the portion of the cable 22 between the secured object 44 and the reference point 46), the closest end of the hollow cylinder 36 is slipped over the adjacent end of the handle 26 (which faces the secured object 44) in an interference fit.

In this position, the hollow cylinder 36 will retain the handle 26 in its position parallel to the portion of the cable 22 between the secured object 44 and the reference point 46, until the hollow cylinder 36 is removed to free the handle 26 to rotate in the opposite direction from that shown in FIG. 10 to release the crimping action retaining the cable 22. It will be appreciated that both the tightening and locking procedure and the unlocking procedure are simple and easy to accomplish, and that they may both be performed by one person.

Figure 12:
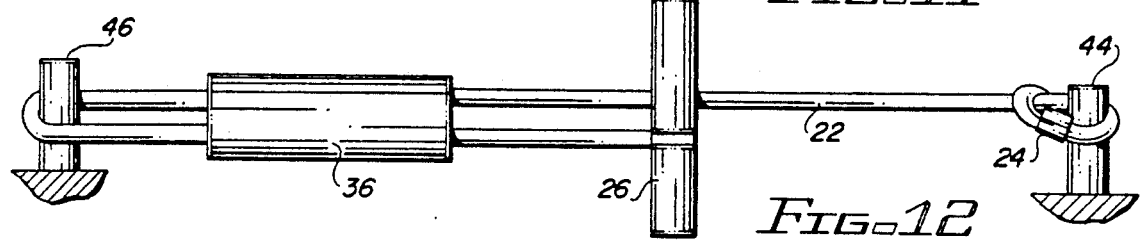
FIG. 12 is a somewhat schematic view of a tie down similar to that of FIG. 9, but with the hollow cylinder in its second alternate potential position around the two portions of the cable between the handle and the reference point.

Referring next to FIG. 12, a second alternate potential position for the hollow cylinder 36 is illustrated. This second position of the hollow cylinder 36 is around the two portions of the cable 22 between the handle 26 and the reference point 46. If the hollow cylinder 36 is located in this second position, its interior diameter must be sufficiently large to encompass the end of the handle 26 together with the diameters of the two portions of the cable 22 between the handle 26 and the reference point 46.

The procedure for tightening the cable 22 is the same as described above in conjunction with FIG. 9. Similarly, the procedure for rotating the handle 26 is the same as shown in FIG. 10. With the handle 26 in the position (shown in FIG. 11) parallel to the portion of the cable 22 between the secured object 44 and the reference point 46, the hollow cylinder 36 is slipped over the adjacent end of the handle 26 facing the reference point 46 in an interference fit. In this position, the hollow cylinder 36 will retain the handle 26 in its position parallel to the portion of the cable 22 between the secured object 44 and the reference point 46, until the hollow cylinder 36 is removed to free the handle 26 to rotate and release the cable 22.

Two alternate embodiments are contemplated by the present invention, neither of which uses the hollow cylinder 36. Instead of using the hollow cylinder 36, alternate mechanisms are used to retain the handle 26 in its position parallel to the portion of the cable 22 between the secured object 44 and the reference point 46. In the first alternate embodiment shown in FIGS. 13 and 14, a hook 50 is located on one end of the handle 26.

Figure 13:
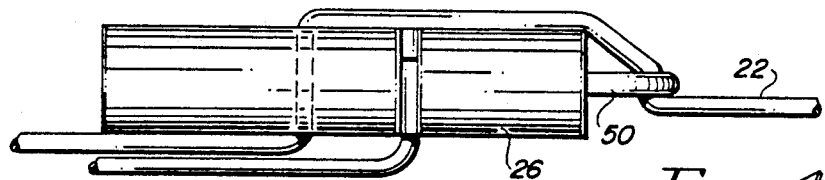
FIG. 13 is a partial view of a first alternate embodiment tie down having a hook mounted on one end of the handle used to hold the cable to retain the handle in position parallel to the portion of the cable between the secured object and the reference point.
Figure 14:
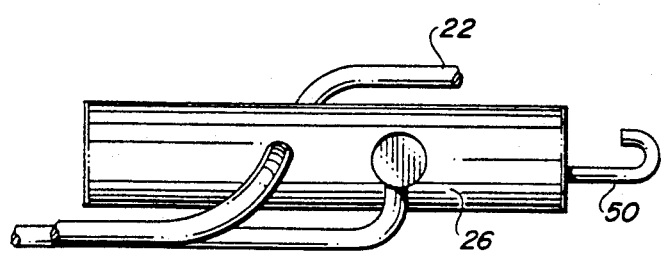
FIG. 14 is a view of the handle shown in FIG. 13, with the handle rotated ninety degrees.

The procedure for tightening the cable 22 is the same as described above in conjunction with FIG. 9. Similarly, the procedure for rotating the handle 26 is the same as shown in FIG. 10. With the handle 26 in its position parallel to the portion of the cable 22 between the secured object 44 and the reference point 46 (as shown in FIG. 11 or 13), the portion of the cable 22 adjacent to the end of the handle 26 having the hook 50 mounted thereon is slipped over the hook 50, as shown in FIG. 13. The hook 50 will then act to retain the handle 26 in its position parallel to the portion of the cable 22 between the secured object 44 and the reference point 46, until the cable 22 is removed from the hook 50 to free the handle 26 to rotate and release the cable 22.

Figure 15:
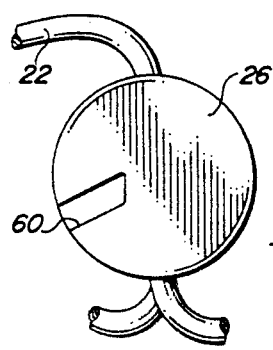
FIG. 15 is a partial view of a second alternate embodiment tie down having a slot located in one end of the handle used to hold the cable to retain the handle in position parallel to the portion of the cable between the secured object and the reference point.

In a second alternate embodiment, a slot 60 is located in one end of the handle 26, which slot 60 may be used to retain the handle 26 in its position parallel to the portion of the cable 22 between the secured object 44 and the reference point 46 (as shown in FIG. 11 or 15). The procedure for tightening the cable 22 is the same as described above in conjunction with FIG. 9. Similarly, the procedure for rotating the handle 26 is the same as shown in FIG. 10.

With the handle 26 in its position parallel to the portion of the cable 22 between the secured object 44 and the reference point 46, the portion of the cable 22 adjacent to the end of the handle 26 having the slot 60 located thereon is slipped into the slot 60, as shown in FIG. 15. The slot 60 will then act to retain the handle 26 in its position parallel to the portion of the cable 22 between the secured object 44 and the reference point 46, until the cable 22 is removed from the slot 60 to free the handle 26 to rotate and release the cable 22.

It may therefore be appreciated from the above detailed description of the preferred embodiment of the present invention that it teaches an improved general purpose tie down device which has a convenient handle which may be pulled to tighten the tie down of the present invention once it is properly positioned. This handle makes the tightening operation both convenient and easy, and also allows greater tension to be placed in the tie down of the present invention without requiring greater effort. The handle is also conveniently located in a position not presenting any difficulty to reach.

In addition, the improved tie down of the present invention utilizes a process of locking or securing the tie down once it is in the proper position which is both easy and simple to accomplish. Both the tightening procedure and the locking procedure may easily be accomplished by a single person, without requiring undue expenditure of effort. Once secured, the tie down will remain solidly locked, and will not be susceptible to sudden inadvertent releasing. In addition, the tie down of the present invention is easy to release, and further tightening is not required in order to accomplish the release of the tie down.

The tie down of the present invention is also of inexpensive and simple construction, therefore making it inexpensive to manufacture. It is durable and long lasting, and of high quality throughout to make the tie down of the present invention an even more desirable device. Finally, all of the aforesaid advantages and objectives of the present invention are achieved without incurring any substantial relative disadvantage.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. An adjustable tie down for securing an object with respect to a reference point, comprising:
    a cable having a first end and a second end;
    means for attaching said first end of said cable to the object;
    a handle having an aperture therethrough, said second end of said cable extending freely through said aperture in said handle and around the reference point, said second end of said cable then being fixedly attached to said handle, said handle being pulled toward the object to tighten said cable between the object and the reference point, said handle then being rotated approximately ninety degrees to a position approximately parallel to the portion of said cable between the object and the reference point, said handle when rotated crimping said cable on both sides of said aperture to prevent said handle from moving longitudinally with respect to said cable; and
    means for retaining said handle in said position approximately parallel to the portion of said cable between the object and the reference point, and said means engaging said handle and said cable.

2. An adjustable tie down as defined in claim 1, wherein said cable is made of rope.

3. An adjustable tie down as defined in claim 1, wherein said cable is made of woven metal cord.

4. An adjustable tie down as defined in claim 1, wherein said attaching means comprises:
    a loop at said first end of said cable, said loop being formed around said cable to form a lasso, said loop being closed by loop retaining means.

5. An adjustable tie down as defined in claim 1, wherein said attaching means comprises:
    a hook attached to said first end of said cable.

6. An adjustable tie down as defined in claim 1, wherein said attaching means comprises:
    a loop at said first end of said cable; and
    an S-hook attached to said loop at said first end of said cable.

7. An adjustable tie down as defined in claim 1, wherein said attaching means comprises:
    a slide hook attached to said first end of said cable.

8. An adjustable tie down as defined in claim 1, wherein said aperture in said handle is just sufficiently large in diameter to allow said cable to pass freely therethrough.

9. An adjustable tie down as defined in claim 1, additionally comprising:
    a slot cut into the side of said handle;
    a second aperture drilled into the top of said handle partially through said handle, the innermost portion of said slot extending just past the centerline of said second aperture, the width of said slot being sufficient to admit said cable therein; and a plug installed on said second end of said cable, the diameter of said plug being just smaller than the diameter of said second aperture in said handle but larger than the width of said slot in said handle, said second end of said cable being placed in said slot in said handle, said cable then being pulled to draw said plug into said second aperture in said handle.

10. An adjustable tie down as defined in claim 9, wherein said aperture in said handle is located just to one side of the middle of the handle, and said slot and said second aperture are located just to the other side of the middle of said handle from said aperture.

11. An adjustable tie down as defined in claim 1, wherein said handle is essentially cylindrical, said retaining means comprising:

a hollow cylinder for placement over one end of said handle and said cable, said hollow cylinder thereby retaining said cable in position adjacent said handle.

12. An adjustable tie down as defined in claim 11, wherein the fit of said hollow cylinder over the end of said handle and said cable is an interference fit acting to retain said hollow cylinder on said end of said handle once it is so placed.

13. An adjustable tie down as defined in claim 11, wherein said hollow cylinder is installed over the portion of said cable between said handle and said first end of said cable, the interior diameter of said hollow cylinder being sufficient to encompass the end of said handle and the diameter of the portion of said cable between said handle and said first end of said cable.

14. An adjustable tie down as defined in claim 11, wherein said hollow cylinder is installed around the two portions of said cable between said handle and the reference point, the interior diameter of said hollow cylinder being sufficiently large to encompass said end of said handle together with the diameters of said two portions of said cable between said handle and said reference point.

15. An adjustable tie down as defined in claim 1, wherein said retaining means comprises:

a hook located on one end of said handle, the portion of said cable between said handle and said first end of said cable being slipped over said hook to retain said handle in its position approximately parallel to the portion of said cable between the object and the reference point.

16. An adjustable tie down as defined in claim 1, wherein said retaining means comprises:

a slot located at one end of said handle, the portion of said cable between said handle and said first end of said cable being slipped into said slot, said slot then acting to retain said handle in its position approximately parallel to the portion of said cable between the object and the reference point.

17. An adjustable tie down for securing an object with respect to a reference point, comprising:

a flexible cable having a first end and a second end;

means for attaching said first end of said cable to the object;

a handle having an aperture therethrough, said second end of said cable extending freely through said aperture in said handle and around the reference point, said second end of said cable then being fixedly attached to said handle, said handle being essentially cylindrical, said handle being pulled toward the object to tighten said cable between the object and the reference point, said handle then being rotated approximately ninety degrees to a position approximately parallel to the portion of said cable between the object and the reference point, said handle when rotated crimping said cable on both sides of said aperture to prevent said handle from moving longitudinally with respect to said cable; and a hollow cylinder for retaining said handle in said position approximately parallel to the portion of said cable between the object and the reference point, said hollow cylinder being installed over the portion of said cable between said handle and said first end of said cable, the interior diameter of said hollow cylinder being sufficient to encompass the end of said handle and the diameter of the portion of said cable between said handle and said first end of said cable, said hollow cylinder being for placement over one end of said handle and said portion of said cable between said handle and said first end of said cable, said hollow cylinder thereby retaining said cable in position adjacent said handle.

* * * * *